Dec. 16, 1924.
H. S. HARKER
TRICYCLE
Filed July 8, 1922
1,519,493
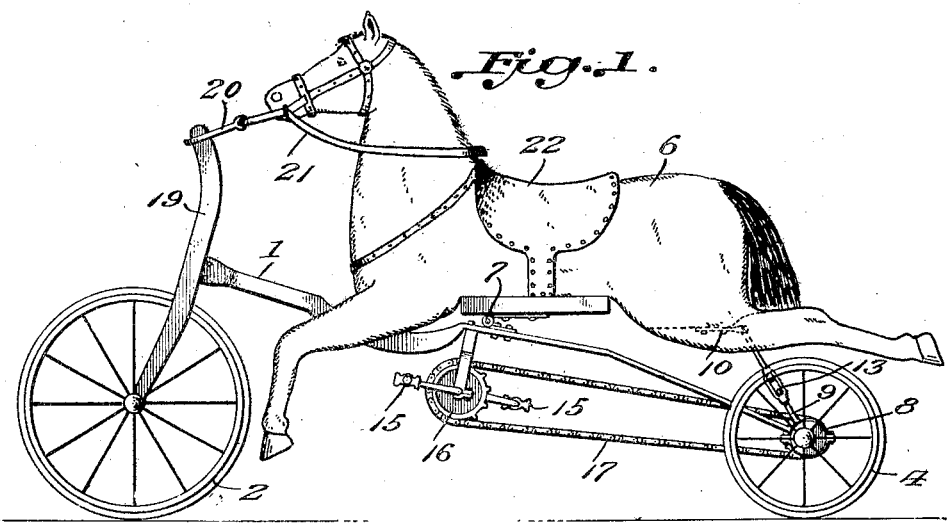
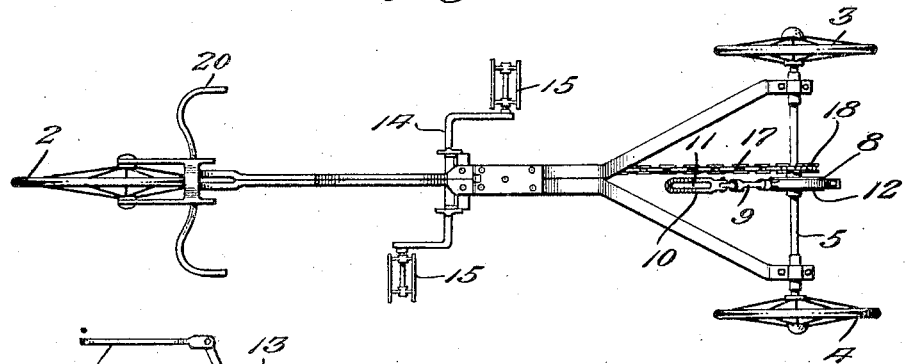
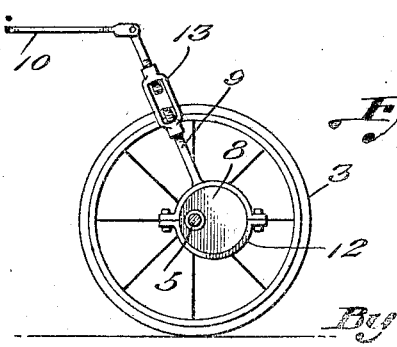

Patented Dec. 16, 1924.

1,519,493

UNITED STATES PATENT OFFICE.

HYRUM SNEITH HARKER, OF SHELLEY, IDAHO, ASSIGNOR TO PONY TRYCICLE CORPORATION, OF SAN FRANCISCO, CALIFORNIA, A CORPORATION OF CALIFORNIA.

TRICYCLE.

Application filed July 8, 1922. Serial No. 573,571.

*To all whom it may concern:*

Be it known that I, HYRUM SNEITH HARKER, a native-born citizen of the United States, residing at Shelley, in the county of Bingham and State of Idaho, have invented certain new and useful Improvements n Tricycles, of which the following is a specification.

My invention relates to an improvement in tricycles.

The object is to provide an amusement device for children and it consists in a combined tricycle and rocking horse with means of adjustment for regulating the amount of rock of the horse as the tricycle is propelled.

In the accompanying drawings:

Figure 1 is a view in side elevation;

Fig. 2 is a plan view of the frame, and

Fig. 3 is a detail.

The numeral 1 represents the frame of the machine. This is mounted on three wheels, 2, 3 and 4, the wheels 3 and 4 being secured to rear axle 5.

An object such as a horse 6, is supported above the frame, to which it is connected by a hinge 7, and the rear end is rocked by means of an eccentric 8, secured on the rear axle 5, and a connecting rod 9, extending from a plate 10, which has a slot 11 by which it is adjustably connected to the horse and to the strap 12 around the eccentric, and the connecting rod is rendered extensible by means of the turn buckle 13.

The pedal shaft 14 has pedals 15 by which the machine is propelled and a sprocket wheel 16 keyed on the pedal shaft transmits motion to the rear shaft 5 and the wheels 3 and 4 through a sprocket chain 17, and the sprocket wheel 18 on the rear shaft.

The machine is steered in the usual way by turning the front fork 19 and wheel 2 through the handle 20, by taking hold of them direct or preferably through the lines 21, extending loosely through the bit.

The rider sits on the saddle 22 with feet upon the pedals and propels the machine as any bicycle or tricycle is propelled and with rotation of the rear shaft the eccentric is turned and the horse is rocked. The extent of rock may be varied from say 4 to 9 inches by the placement of the plate 10 and the adjustment of the connecting rod 9 through turn buckle 13.

In this way an amusement device is provided for children of various sizes which affords an added interest because it both rocks and travels.

I claim:

1. The combination with a frame, and an animal figure hinged thereto, of a shaft, means for propelling the shaft, a connecting rod extending from the shaft to the figure whereby to rock the latter as the vehicle is propelled, and means for regulating and varying the extent of the rock of the figure.

2. The combination with a frame, and an animal figure hinged thereto, of a shaft, means for propelling the shaft, a connecting rod extending from the shaft to the figure whereby to rock the latter as the vehicle is propelled, and means for regulating and varying the extent of the rock of the figure, said last named means consisting of a slotted plate adjustably secured to the figure.

3. The combination with a frame, and an animal figure hinged thereto, of a shaft, means for propelling the shaft, a connecting rod extending from the shaft to the figure whereby to rock the latter as the vehicle is propelled, and means for regulating and varying the extent of rock of the figure, said last named means consisting of a slotted plate adjustably secured to the figure, and means for regulating the length of the connecting rod.

4. The combination with a frame, and an animal figure hinged thereto, of a shaft, means for propelling the shaft, an eccentric secured to the shaft, an adjustable connecting rod extending from the eccentric to the figure, whereby to rock the latter as the vehicle is propelled, and means for varying the extent of the rock of the figure.

In testimony whereof I affix my signature.

HYRUM SNEITH HARKER.